United States Patent
Yang (10) Patent No.: US 12,322,952 B2
(45) Date of Patent: Jun. 3, 2025

(54) DC SOLID STATE CIRCUIT BREAKERS FOR BIDIRECTIONAL APPLICATIONS

(71) Applicant: Siemens Industry, Inc., Alpharetta, GA (US)

(72) Inventor: Guang Yang, Johns Creek, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 147 days.

(21) Appl. No.: 18/474,650

(22) Filed: Sep. 26, 2023

(65) Prior Publication Data

US 2025/0105617 A1 Mar. 27, 2025

(51) Int. Cl.
*H02H 3/087* (2006.01)
*H02H 1/00* (2006.01)

(52) U.S. Cl.
CPC .......... *H02H 3/087* (2013.01); *H02H 1/0007* (2013.01)

(58) Field of Classification Search
CPC ........ H02H 3/087; H02H 1/0007; H02H 3/05; H02H 3/18; H02H 3/081; H02H 3/021; H01H 9/541
USPC .................................. 361/101, 91.1
See application file for complete search history.

(56) References Cited

U.S. PATENT DOCUMENTS

| | | | |
|---|---|---|---|
| 10,591,547 B2 * | 3/2020 | Wu ........... | H02H 3/044 |
| 11,398,724 B1 * | 7/2022 | Yang ............ | H02H 3/20 |
| 2015/0236498 A1 * | 8/2015 | Davidson ........ | H03K 17/74 |
| | | | 361/57 |
| 2016/0156173 A1 * | 6/2016 | Gardner ........ | H02H 3/202 |
| | | | 361/91.1 |
| 2019/0363200 A1 | 11/2019 | Höft et al. | |
| 2021/0226441 A1 * | 7/2021 | Telefus ........ | H02H 3/162 |
| 2023/0163587 A1 * | 5/2023 | Lu ................ | H03K 17/687 |
| | | | 361/93.1 |
| 2023/0230783 A1 * | 7/2023 | Yang ............ | H02H 3/42 |
| | | | 361/115 |
| 2023/0261462 A1 * | 8/2023 | Zhang ........... | H02H 9/02 |
| | | | 361/93.9 |

(Continued)

FOREIGN PATENT DOCUMENTS

CN 110768651 B * 3/2021
CN 113765076 A * 12/2021

(Continued)

OTHER PUBLICATIONS

U.S. Appl. No. 18/179,548, filed Mar. 7, 2023; pp. 1-xx.

*Primary Examiner* — Dharti H Patel (57) ABSTRACT

A direct current (DC) solid state circuit breaker includes a first terminal, a second terminal, a power electronics section comprising at least a first transistor switch, and one or more airgap sections that include at least a second transistor switch and a third transistor switch. The second transistor switch and the third transistor switch arranged in back to back configuration such that i) the second transistor switch is configured to interrupt current flowing in a first direction from the first terminal to the second terminal and ii) the third transistor is configured to interrupt current flowing in a second direction from the second terminal to the first side terminal. The DC solid state circuit breaker also includes a controller configured to detect a fault condition and control operation of the power electronics section and the one or more airgap sections in response to detecting the fault condition.

20 Claims, 8 Drawing Sheets

(56) References Cited

U.S. PATENT DOCUMENTS

| | | | |
|---|---|---|---|
| 2024/0305086 A1* | 9/2024 | Yang | H02H 9/043 |
| 2024/0321540 A1* | 9/2024 | Yang | H01H 33/596 |
| 2025/0069837 A1* | 2/2025 | Kinsel | G01R 31/3275 |

FOREIGN PATENT DOCUMENTS

| | | | | |
|---|---|---|---|---|
| CN | 114172129 A | * | 3/2022 | |
| CN | 115133506 A | * | 9/2022 | |
| CN | 115714352 A | * | 2/2023 | |
| EP | 2953150 B1 | | 9/2017 | |
| EP | 3790138 A1 | | 3/2021 | |
| JP | 2016062790 A | | 4/2016 | |
| WO | WO-2006077069 A1 | * | 7/2006 | H02P 6/14 |
| WO | WO-2014177874 A2 | * | 11/2014 | H01H 33/596 |
| WO | 2023041200 A1 | | 3/2023 | |

* cited by examiner

DC SOLID STATE CIRCUIT BREAKERS FOR BIDIRECTIONAL APPLICATIONS

FIELD

The present disclosure relates generally to DC solid state circuit breakers.

BACKGROUND

Circuit breakers are typically used to protect downstream circuits and equipment in various environments, such as residential homes or buildings, hospitals, industrial settings such as factories, etc., in case of a fault, such as in an overcurrent or a short circuit situation. Generally, circuit breakers carry current from a power supply to a load under normal operating conditions and break, or interrupt, the current in order to protect the load under fault conditions, for example when rising current due to a short circuit is detected. Types of circuit breakers include mechanical circuit breakers and solid state circuit breakers (SSCBs). Mechanical circuit breakers interrupt flow of current by separation of mechanical contacts. Because of inductive energy in the circuit, an arc forms between the contacts. The electrical resistance of the arc causes voltage that opposes system voltage and eventually stops the flow of current. SSCBs, on the other hand, use semiconductor switching elements, such as transistor switches, to open a circuit and interrupt flow of the current.

Recently DC power grid systems have been attracting attention as an alternative to AC power systems. Such DC power grid systems sometimes include components that involve bidirectional current flow, such as current flow for providing power from the DC power grid to a component such as a battery, and current flow from the component to the power grid, such as when the battery supplies power to the DC power grid. Mechanical DC circuit breakers are typically bidirectional in that when a mechanical switch is opened, current flow is interrupted regardless of the direction of the current flow. However, mechanical DC circuit breakers face challenges such as switching lifetime, interruption reliability, etc., especially when the voltage is high. DC solid state circuit breakers have greater lifetime and better interruption reliability as compared to mechanical DC circuit breakers. However, due to inherent characteristics of semiconductor components used in DC solid state circuit breakers, typical DC circuit breakers are unidirectional and provide only one-way protection in a DC power system.

SUMMARY

In an embodiment, a DC solid state circuit breaker is provided. The DC solid state circuit breaker comprises a first terminal, a second terminal, a power electronics section comprising at least a first transistor switch, and one or more airgap sections comprising at least a second transistor switch and a third transistor switch. The second transistor switch and the third transistor switch arranged in back to back configuration such that i) the second transistor switch is configured to interrupt current flowing in a first direction from the first terminal to the second terminal and ii) the third transistor switch is configured to interrupt current flowing in a second direction from the second terminal to the first terminal. The DC solid state circuit breaker further comprises a controller configured to detect a fault condition and control operation of the power electronics section and the one or more airgap sections in response to detecting the fault condition.

In another embodiment, a direct current DC solid state circuit breaker is provided. The DC solid state circuit breaker comprises a first DC solid state circuit breaker module including a first power electronics section, a first airgap section, a first current sensing device, and a first controller. The DC solid state circuit breaker also comprises a second DC solid state circuit breaker module including a second power electronics section comprising, a second airgap section, a second current sensing device, and a second controller. The first controller is configured to, when a fault is detected, operate the first DC solid state circuit breaker module to provide current interruption or maintain the first DC solid state circuit breaker module in a conducting state based on a direction of current flow sensed by the first current sensing device. Further, the second controller is configured to, when the fault is detected, operate the second DC solid state circuit breaker module to provide current interruption or maintain the second DC solid state circuit breaker module in a conducting state based on a direction of current flow sensed by the second current sensing device.

In still another embodiment, a method for interrupting current in a DC solid state circuit breaker is provided. The method includes setting a power electronics section comprising at least a first transistor switch to operate in a conducting state. The method also includes setting one or more airgap sections to operate in the conducting state comprising at least a second transistor switch and a third transistor switch. The second transistor switch and the third transistor switch arranged in back to back configuration such that i) the second transistor switch is configured to interrupt current flowing in a first direction from a first terminal of the DC solid state circuit breaker to a second terminal of the DC solid state circuit breaker and ii) the third transistor switch is configured to interrupt current flowing in a second direction from the second terminal to the first terminal. The method further includes, while the power electronics section and the one or more airgap sections are operating in the conducting state, detecting a fault condition. The method further includes, in response to detecting the fault condition, controlling operation of the power electronics section and the one or more airgap sections to interrupt current flowing in a first direction or in a second direction through the DC solid state circuit breaker.

BRIEF DESCRIPTION OF THE DRAWINGS

Objects, features, and advantages of the present invention will become apparent upon reading the following description in conjunction with the drawing figures, in which.

DETAILED DESCRIPTION

In embodiments described below, a DC solid state circuit breaker includes a first terminal, a second terminal, a power electronics section comprising at least a first transistor switch, and at least one airgap section that may generally be provided in the DC solid state circuit breaker for fail-safe operation and galvanic isolation. The at least one air gap section may include at least a second transistor switch and a third transistor switch. The second transistor switch and the third transistor switch may be arranged such that i) the second transistor switch is configured to interrupt current flowing through the DC solid state circuit breaker in a direction from the first terminal to the second terminal and ii) the third transistor switch is configured to interrupt current flowing through the DC solid state circuit breaker in a direction from the second terminal to the first terminal. The one or more airgaps are thus able to interrupt current and provide isolation whether the current is flowing through the DC solid state circuit breaker in the direction from the first terminal to the second terminal or in the direction from the second terminal to the first terminal. In an embodiment, the DC solid state circuit breaker further includes a current sensing device configured to sense a direction of current flow through the DC solid state circuit breaker, and a controller configured to control the power electronics section and the one or more airgap sections based on the direction of the current flow. In some embodiments, the power electronics section further includes a fourth transistor switch arranged in back to back configuration with the first transistor switch. As explained in more detail below, in such embodiments, the DC solid state circuit breaker provides both i) bidirectional current interruption in the power electronics section and ii) bidirectional fail-safe operation and isolation in the one or more airgap sections. These and other devices and techniques described herein provide DC solid state circuit breakers that are capable of protecting power source and load components in bidirectional DC power applications.

Figure 1:
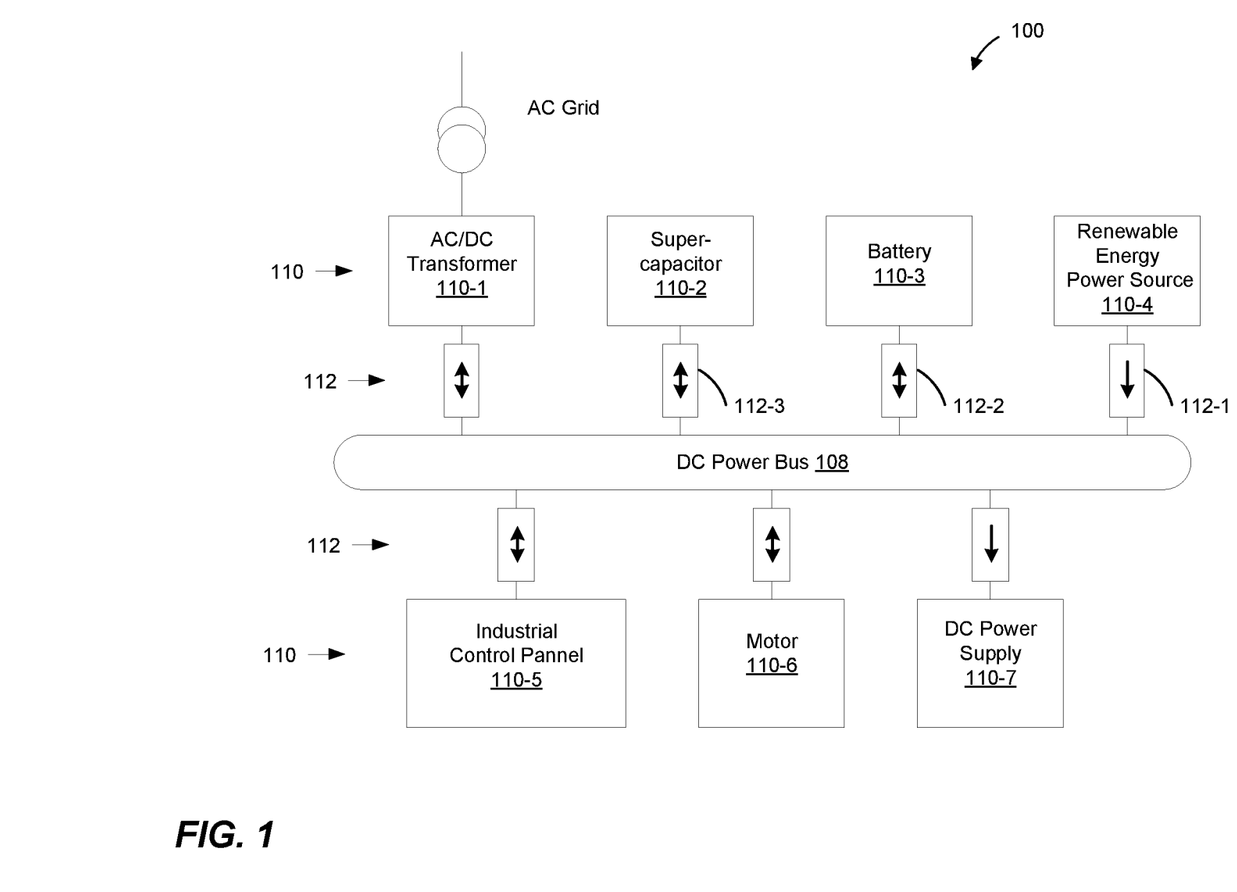
FIG. 1 is a block diagram of a DC power grid system in which a DC solid state circuit breaker may be used, according to an embodiment.

FIG. 1 is a block diagram of an example DC power system 100 in which a DC solid state circuit breaker with bidirectional current interruption capabilities may be utilized, according to an embodiment. The DC power system 100 includes a DC bus 108 configured to distribute DC power to and from a plurality of components 110. The components 110 may include an AC/DC transformer 110-1 coupled to an AC power source, such as AC power grid, a supercapacitor 110-2, a battery 110-3, a renewable energy (e.g., solar) power source 110-4, an industrial control panel 110-5, a DC motor 110-6, and a DC power supply 110-7. In an embodiment, the components 110 include one or more unidirectional components configured as either power source components that provide power to the DC bus 108 or load components that consume power provided via the DC bus 108. For example, the renewable energy power source 110-4 is a unidirectional power source component that is configured to provide power to the DC bus 108. As another example, the DC motor 110-6 and the DC power supply 110-7 are unidirectional load components configured to consume power provided via the DC bus 108. The components 110 also include one or more bidirectional components configured to, at one time, act as power source components that provide power to the DC bus 108 and, at another time, act as load components that consume power provided via the DC bus 108. As an example, the supercapacitor 110-2 and the battery 110-3 are bidirectional components configured to, at one time, act as power source components that provide power to the DC bus 108 and, at another time, act as load components that are charged by power provided via the DC bus 108.

The DC power system 100 also includes a plurality of circuit breakers 112 coupled between DC bus 108 and the components 110. The circuit breakers 112 are generally configured to protect the components 110 by cutting off power flow to the components 110 under fault conditions, such as in the event of short circuit or overcurrent conditions. In an embodiment, at least some of the circuit breakers 112 may provide bidirectional current breaking capabilities. For example, a unidirectional circuit breaker 112-1 with bidirectional current breaking capabilities may be coupled between the renewable energy power source component 110-4 and the DC bus 108. The unidirectional circuit breaker 112 (e.g., 112-1) with bidirectional current breaking capabilities may be configured to protect the renewable energy power source component 110-4 from back currents that may flow through the DC bus 108, for example, when a short circuit occurs downstream from the circuit breaker 112-1, in an embodiment. The circuit breakers 112 may also include bidirectional circuit breakers 112 that may be coupled between bidirectional components 110 and the DC bus 108. For example, a bidirectional circuit breaker 112-2 may be coupled between the battery 110-3 that is configured to act as a power source that provides power to the DC bus 108 and a load that consumes power provided via the DC bus 108. As another example, a bidirectional circuit breaker 112-3 may be coupled between the supercapacitor 110-2 that is configured to act as a power source that provides power to the DC bus 108 and a load that consumes power provided via the DC bus 108. The bidirectional circuit breaker 112 (e.g., 112-2, 112-3) may be configured to cut off power provided by bidirectional component 110 when the bidirectional component 110 is acting as a power source, and to cut off power flowing to the bidirectional component 110 when the bidirectional component 110 is acting as a load, in an embodiment.

It is noted that although example circuit breakers of the present disclosure may be utilized in a DC power system such as the DC power system 100 of FIG. 1, the disclosure is not so limited, and the circuit breakers of the present disclosure may be used in other scenarios in which bidirectional current breaking capabilities may be needed or desired, in some embodiments. For example, a circuit breaker of the present disclosure may be coupled directly between a power source component and a load component, or directly between two bidirectional components that alternate between operating as power source components and load components, in some embodiments.

Figure 2:
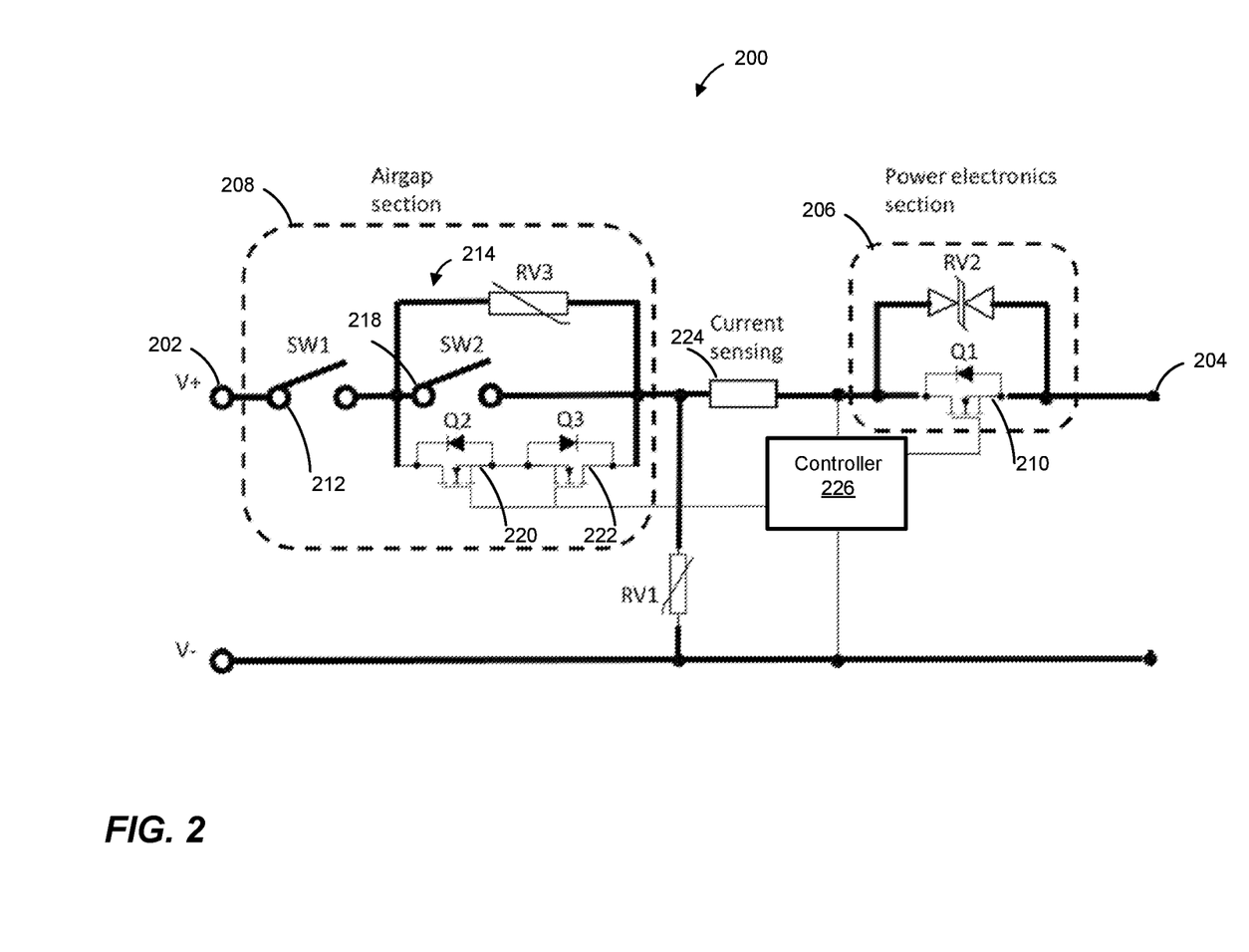
FIG. 2 is a diagram of a unidirectional DC solid state circuit breaker with bi-directional interruption capabilities, according to an embodiment.

FIG. 2 is a diagram of a unidirectional DC solid state circuit breaker 200 with bidirectional current interruption capabilities, according to an embodiment. The DC solid state circuit breaker 200 is configured to operate in a DC power system, such as the DC power system 100 of FIG. 1, in some embodiments. For example, the DC solid state circuit breaker 200 corresponds to the DC solid state circuit breaker 112-1 of FIG. 1, in an embodiment. In other embodiments, DC solid state circuit breaker 200 is utilized with DC power systems different from the DC power system 100 of FIG. 1 or is utilized with components that are not parts of a DC power system.

The DC solid state circuit breaker 200 includes a first terminal 202 configured to couple the DC solid state circuit breaker 200 to a power source and a second terminal 204 configured to couple the DC solid state circuit breaker 200 to a load. The DC solid state circuit breaker 200 also includes a power electronics section 206 and an airgap section 208. The power electronics section 206 includes a first transistor switch Q1 210 configured to provide current interruption in the DC solid state circuit breaker 200 under a fault condition, such as a short circuit or an overcurrent condition. The airgap section 208 includes an isolation switch SW1 212 and a hybrid airgap module 214. The isolation switch SW1 212 may be configured to provide physical or galvanic isolation under a fault condition, such as a short circuit or an overcurrent condition. The hybrid airgap module 214 includes i) a main path comprising a switch 218 and ii) a bypass path, in parallel with the main path, comprising a second transistor switch Q2 220 and a third transistor switch Q3 222. Each of the switch SW1 212 and the switch SW2 218 may comprise a mechanical switch configured to open by breaking-apart of mechanical contacts, for example.

The hybrid airgap module 214 may generally be provided as a fail-safe component in case of failure of the power electronics section 206 to interrupt current flowing in the direction from the first terminal 202 to the second terminal 204. For example, in case the power electronics section 206 fails to interrupt current flowing in the direction from the first terminal 202 to the second terminal 204, switching ON of the transistor switches 220, 222 and opening of the switch 218 creates a low resistance path for current flowing in the main path of the hybrid airgap module 214 to be diverted to the bypass path. The transistor switches 220, 222 are then switched OFF to extinguish the arc in the switch 218. The airgap section 208 may thus be configured to interrupt DC current without the current being extinguished at zero crossing as would be possible in an AC system. Subsequently, the isolation switch 212 may be opened under zero, or almost zero, current conditions to provide galvanic isolation of the DC solid state circuit breaker 200, in an embodiment.

As used herein, the term "transistor" may refer to a metal-oxide-semiconductor field-effect transistor (MOSFET), an insulated-gate bipolar transistor (IGBT), or another suitable type of semiconductor transistor, in various embodiments. For example, each of the first transistor switch Q1, the second transistor switch Q2, and the third transistor switch Q3 may comprise a MOSFET, an IGBT, or another suitable type of semiconductor transistor, in various embodiments.

The first transistor switch Q1 210 in the power electronics section 206 of the DC solid state circuit breaker 200 is configured to interrupt current flowing in the direction from the first terminal 202 to the second terminal 204, in an embodiment. The first transistor switch Q1 210 in the power electronics section 206 of the DC solid state circuit breaker 200 is generally not capable of interrupting current flowing in a reverse direction from the second terminal 204 to the first terminal 202, due to intrinsic diode of the first transistor switch Q1 210. For example, even if the first transistor switch Q1 210 is switched OFF with intention to interrupt current flowing in the direction from the second terminal 204 to the first terminal 202, the current will continue flowing through the intrinsic body diode of the first transistor switch Q1 210. Such current flow, under a fault condition, may lead to overheating and damage of the first transistor switch Q1 210. In an embodiment, to provide bidirectional current breaking capabilities of the DC solid state circuit breaker 200, the second transistor switch Q2 220 and the third transistor switch Q3 222 in the airgap section 208 are arranged in a back to back configuration. Because the hybrid airgap module 214 includes two transistor switches arranged in a back to back configuration, the airgap section 208 is capable of interrupting current regardless of whether the current is flowing in a direction from the first terminal 202 to the second terminal 204 or in a direction from the second terminal 204 to the first terminal 202, in an embodiment.

In an embodiment, the DC solid state circuit breaker 220 includes a current sensing device 224 and a controller 226. The current sensing device 224 is configured to sense a direction of current flow through the DC solid state circuit breaker 200, in an embodiment. The current sensing device 224 may comprise a shunt, a current transformer, or another suitable type of a current sensing device. The controller 226 may comprise sensing and control circuitry configured to detect fault conditions and to operate the power electronics section 206 and the airgap section 208 in response to detecting a fault condition, such as a short circuit or an overcurrent condition. In an embodiment, the controller 226 is configured to determine a sequence of operation of the power electronics section 206 and the airgap section 208 based on the direction of current sensed by the current sensing device 224. For example, if the direction of current flow as sensed by the current sensing device 224 when a fault is detected is from the first terminal 202 to the second terminal 204, the power electronics section 206 may first operate the power electronics section 206 to interrupt the current and may then operate the airgap section 208 to provide fail-safe operation and galvanic isolation. On the other hand, if the direction of current flow as sensed by the current sensing device 224 when the fault is detected is in the direction from the second terminal 204 to the first terminal 202, the controller 226 may operate the airgap section 208 to interrupt the current while maintaining operation of the power electronics section 206 unchanged (in a conducting state) to prevent overheating and damage of the power electronics section 206. Accordingly, in this case, the airgap section 208, instead of the power electronics section 206, provides current interruption under the fault condition.

More specifically, in an embodiment, if the direction of current flow as sensed by the current sensing device 224 when a fault is detected is in the direction from the first terminal 202 to the second terminal 204, the power electronics section 206 may first turn OFF the first transistor switch Q1 210 in the power electronics section 206. Turning OFF the first transistor switch Q1 210 in the power electronics section 206 may interrupt the current flowing in the direction from the first terminal 202 to the second terminal 204. The controller 226 may then switch ON the second transistor switch Q2 220 and the third transistor switch Q3 222 in the bypass path of the hybrid airgap module 214 of the airgap section 208 and to open the switch SW2 218 in the main path of the hybrid airgap module 214 of the airgap section 208. The second transistor switch Q2 220 and the third transistor switch Q3 222 in the bypass path of the hybrid airgap module 214 may remain ON long enough for the switch 218 in the main path to open enough to withstand system voltage. The controller 226 may then switch OFF the second transistor switch Q2 220 and the third transistor switch Q3 222. Switching OFF the second transistor switch Q2 220 and the third transistor switch Q3 222 extinguishes the arc that may form in the switch SW2 218 if the switch SW2 218 is opened under current in the fail-safe operation of the DC solid state circuit breaker 200. After switching OFF the second transistor switch Q2 220 and the third transistor switch Q3 222, the isolation switch 212 may be opened to provide galvanic isolation, in an embodiment.

On the other hand, if the direction of current flow as sensed by the current sensing device 224 when the fault is detected is from the second terminal 204 to the first terminal 202, the controller 226 may maintain the switched ON state of the first transistor switch Q1 210 in the power electronics section 206 and may instead control the airgap section 208 to switch ON the second transistor switch Q2 220 and the third transistor switch Q3 222 in the bypass path of the hybrid airgap module 214 and open the switch SW2 218 in the main path of the hybrid airgap module 214, without switching OFF the first transistor switch Q1 210. The second transistor switch Q2 220 and the third transistor switch Q3 222 in the bypass path of the hybrid airgap module 214 may remain ON long enough for the switch 218 in the main path of the hybrid airgap module 214 to open. The controller 226 may the turn OFF the second transistor switch Q2 220 and the third transistor switch Q3 222 to interrupt the current. Because the second transistor switch Q2 220 and the third transistor switch Q3 222 are arranged in a back to back configuration, turning OFF the second transistor switch Q2 220 and the third transistor switch Q3 222 may interrupt the current regardless of whether the current is flowing in the direction from the first terminal 202 to the second terminal 204 or in the direction from the second terminal 204 to the first terminal 202. For example, in the configuration in FIG. 2, the second transistor switch Q2 222 is arranged such that the intrinsic body diode of the second transistor switch Q2 222 will not conduct current flowing in the direction from the second terminal 204 to the first terminal 202. When the current is interrupted in the hybrid airgap module 214, the isolation switch 212 may be opened to provide galvanic isolation, in an embodiment.

Referring still to FIG. 2, as described above, the DC solid state switch 200 provides bidirectional current interruption capabilities by including back to back transistor switch configuration in the bypass path of the hybrid airgap module 214. The power electronics section 206, on the other hand, includes only a single transistor switch that can only interrupt current flowing in one direction from the first terminal 202 to the second terminal 204, in the illustrated embodiment. Thus, the DC solid state switch 200 may not be capable of providing fail-safe redundancy when current is flowing in the direction from the first terminal 202 to the second terminal 204. On the other hand, because the power electronics section 206 includes only a single transistor switch, the heat generated when current flows through the power electronics section 206 is reduced as compared to a configuration in which two transistor switches in a back to back configuration are provided in the power electronics section 206, in an embodiment. Accordingly, although the DC solid state switch 200 may not be capable of providing fail-safe redundancy when current is flowing in the direction from the first terminal 202 to the second terminal 204, the DC solid state switch 200 may be well suited for generally unidirectional applications in which reverse direction current breaking capabilities are employed relatively infrequently, such as to provide protection against back current or in reverse polarity connection situations, in at least some embodiments.

Figure 3:
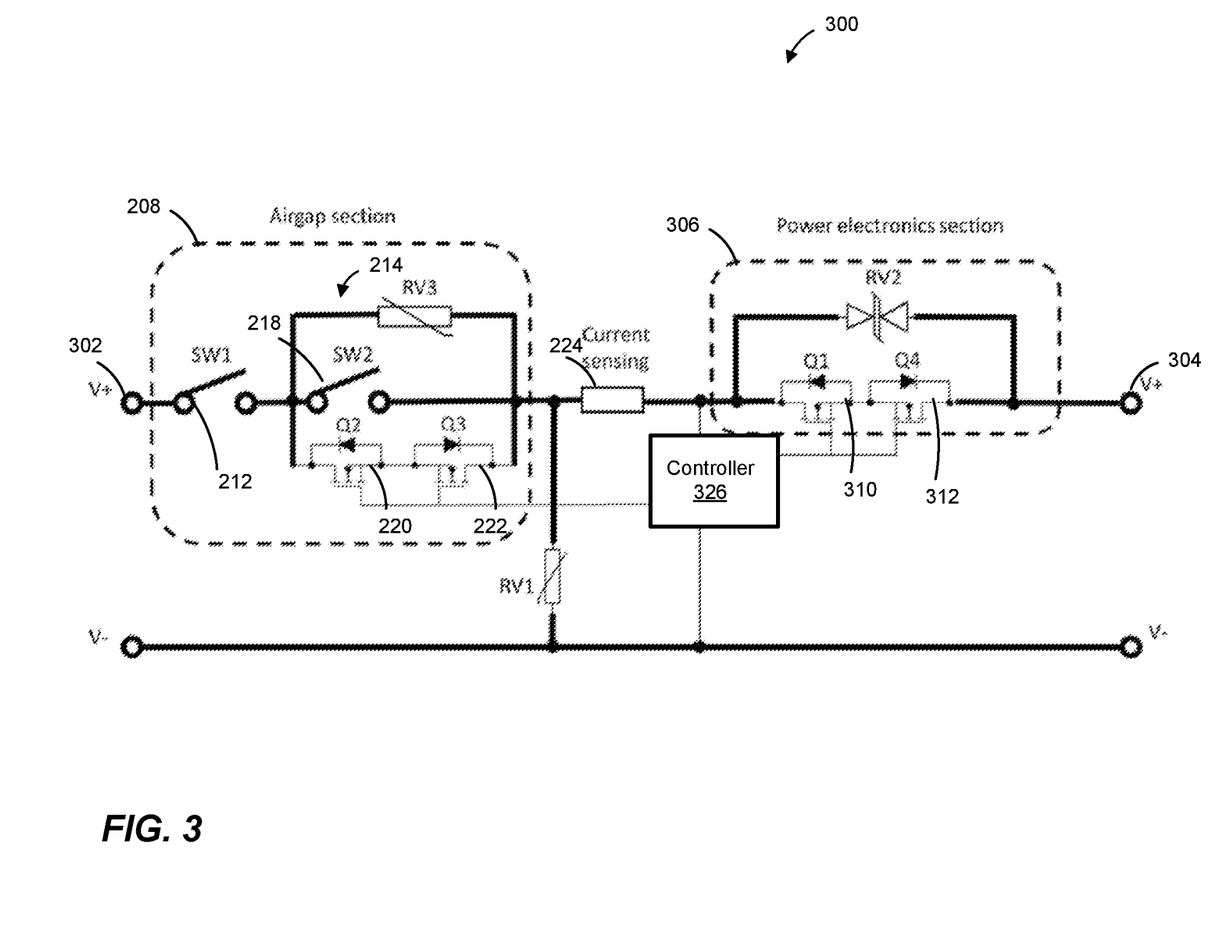
FIG. 3 is a diagram of a bidirectional DC solid state circuit breaker with airgap protection on one side, according to an embodiment.

FIG. 3 is a diagram of a bidirectional DC solid state circuit breaker 300, according to an embodiment. The bidirectional DC solid state circuit breaker 300 is configured to operate in a DC power system, such as the DC power system 100 of FIG. 1, in some embodiments. For example, the DC solid state circuit breaker 200 corresponds to the DC solid state circuit breakers 112-2, 112-3 of FIG. 1, in an embodiment. In other embodiments, the bidirectional DC solid state circuit breaker 300 is utilized with DC power systems different from the DC power system 100 of FIG. 1 or is utilized with components that are not parts of a DC power system.

The DC solid state circuit breaker 300 includes a first terminal 302 configured to couple the DC solid state circuit breaker 300 to a component that acts as a power source at one time and a second terminal 304 configured to couple the DC solid state circuit breaker 300 to a component that acts as a power source at another time, in an embodiment. The bidirectional DC solid state circuit breaker 300 is similar to the unidirectional DC solid state circuit breaker 200 with bidirectional current breaking capabilities of FIG. 2 and includes same-numbered elements with the unidirectional DC solid state circuit breaker 200 with bidirectional current breaking capabilities of FIG. 2. Like the DC solid state circuit breaker 200 of FIG. 2, the DC solid state circuit breaker 300 includes the airgap section 208. Unlike the DC solid state circuit breaker 200 of FIG. 2, the DC solid state circuit breaker 300 includes a power electronics section 306 that includes a first transistor switch Q1 310 and a fourth transistor switch Q4 312. The first transistor switch Q1 310 and the fourth transistor switch Q4 312 are arranged in back to back configuration. Because the power electronics section 306 includes two transistor switches arranged in back to back configuration, the power electronics section 306 is able to interrupt current regardless of whether the current is flowing in the direction from the first terminal 302 to the second terminal 304 or in the direction from the second terminal 304 to the first terminal 302, in an embodiment. Similarly, the airgap section 208 of the DC solid state circuit breaker 300 has bidirectional circuit breaking capabilities as described with reference to FIG. 2, in an embodiment. Thus, the airgap section 208 of the DC solid state circuit breaker 300 provides bidirectional fail-safe operation of the DC solid state circuit breaker 300, in an embodiment.

The bidirectional DC solid state circuit breaker 300 includes a controller 326 that is similar to the controller 226 of the DC solid state circuit breaker 200 of FIG. 2, in an embodiment. The controller 326 is configured to detect fault conditions and to operate the power electronics section 306 and the airgap section 208 in response to detecting a fault condition, such as a short circuit or an overcurrent condition. Because both the power electronics section 306 and the airgap section 208 have bidirectional current breaking capabilities, the controller 326 may need not to rely on a sensed direction of the current flow through the DC solid state circuit breaker 300 to determine the operating sequence of the power electronics section 306 and the airgap section 208, in an embodiment. For example, the controller 326 may operate the power electronics section 306 for current interruption regardless of whether the current is flowing in the direction from the first terminal 302 to the second terminal 304 or in the direction from the second terminal 304 to the first terminal 302, in an embodiment. More specifically, when a fault is detected, the controller 326 may switch OFF the first transistor switch Q1 310 and the fourth transistor switch Q4 312 in the power electronics section 306 regardless of whether the current is flowing in the direction from the first terminal 302 to the second terminal 304 or in the direction from the second terminal 304 to the first terminal 302, in an embodiment. Similarly, the controller 326 may operate the airgap section 208 as described above in connection with FIG. 2 to provide fail-safe operation and galvanic isolation regardless of whether the current is flowing in the direction from the first terminal 302 to the second terminal 304 or in the direction from the second terminal 304 to the first terminal 302, in an embodiment. Accordingly, although the bidirectional DC solid state circuit breaker 300 is illustrated in FIG. 3 as including the current sensing device 224, the bidirectional DC solid state circuit breaker 300 omits the current sensing device 224, in some embodiments.

Figure 4:
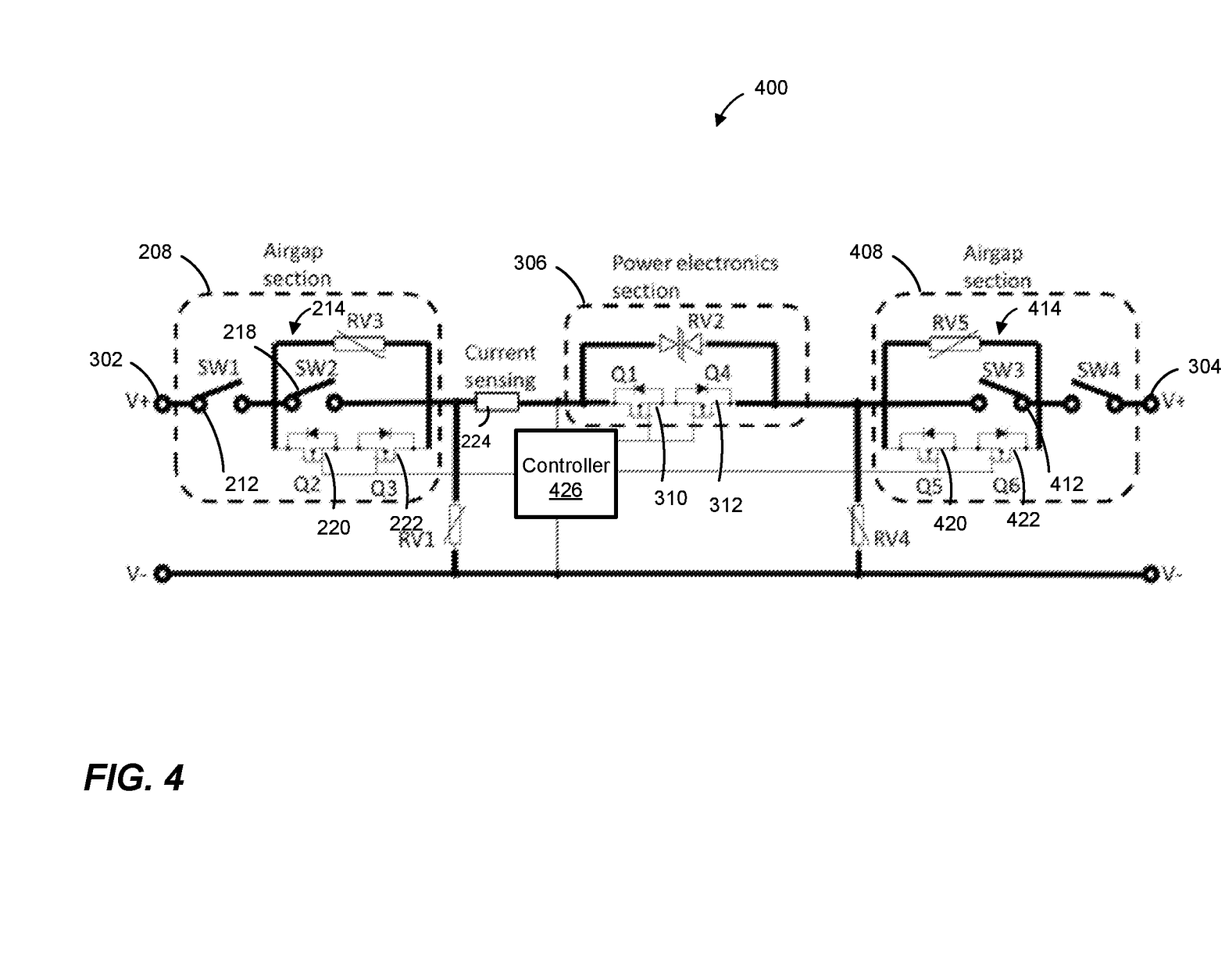
FIG. 4 is a diagram of a bidirectional DC solid state circuit breaker with airgap protection on two sides, according to an embodiment.

FIG. 4 is a diagram of a bidirectional DC solid state circuit breaker 400, according to another embodiment. The bidirectional DC solid state circuit breaker 400 is configured to operate in a DC power system, such as the DC power system 100 of FIG. 1, in some embodiments. For example, the DC solid state circuit breaker 400 corresponds to the DC solid state circuit breakers 112-2, 112-3 of FIG. 1, in an embodiment. In other embodiments, the bidirectional DC solid state circuit breaker 400 is utilized with DC power systems different from the DC power system 100 of FIG. 1 or is utilized with components that are not parts of a DC power system.

The bidirectional DC solid state circuit breaker 400 is similar to the bidirectional DC solid state circuit breaker 300 of FIG. 3 and includes same-numbered elements with the DC solid state circuit breaker 300 of FIG. 3. The DC solid state circuit breaker 400 includes the power electronics section 306 and the airgap section 208 provided between the power electronics section 306 and the first terminal 302. The DC solid state circuit breaker 400 additionally includes a second airgap section 408 provided between the power electronics section 306 and the second terminal 304. The second airgap section 408 is configured to provide fail-safe operation and galvanic isolation of the DC solid state circuit breaker on the side of the second terminal 304. The second airgap section 408 is generally a mirrored version of the first airgap section 208, in an embodiment. Like the first airgap section 208, to provide bidirectional current interruption capabilities, the second airgap section 408 includes a fifth transistor switch Q5 420 and a sixth transistor switch Q6 422 arranged in the back to back configuration in a bypass path of a hybrid airgap module 414 of the second airgap section 408. Thus, the bidirectional DC solid state circuit breaker 400 provides fail-safe operation and galvanic isolation from a power source regardless of whether the component coupled to the first terminal 302 is acting as the power source and the component coupled to the second terminal 304 is acting as a load or, vice versa, the component coupled to the terminal 304 is acting as the power source and the component coupled to the terminal 302 is acting as a load, in an embodiment.

The bidirectional DC solid state circuit breaker 400 includes a controller 426 that is similar to the controller 326, in an embodiment. Similar to the controller 326, the controller 426 may operate the power electronics section 306 to interrupt the current regardless of whether the current is flowing in the direction from the first terminal 302 to the second terminal 304 or in the direction from the second terminal 304 to the first terminal 302, in an embodiment. Similarly, the controller 426 may operate the airgap section 208 and the airgap section 408 to provide fail-safe operation and galvanic isolation regardless of whether the current is flowing in the direction from the first terminal 302 to the second terminal 304 or in the direction from the terminal 304 to the terminal 302, in an embodiment. Accordingly, although the bidirectional DC solid state circuit breaker 300 is illustrated in FIG. 3 as including the current sensing device 224, the bidirectional DC solid state circuit breaker 300 omits the current sensing device 224, in some embodiments.

In some embodiments, however, the controller 426 is configured to determine whether to operate the airgap section 208 or the airgap section 408 to provide fail-safe operation and galvanic isolation based on a direction of current flow sensed by the current sensing device 224. For example, if the current as sensed by the current sensing device 224 is in the direction from the first terminal 302 to the second terminal 304 when a fault is detected, the controller 426 may first operate the power electronics section 306 for current interruption and may then operate the airgap section 308 for fail-safe operation and galvanic isolation while maintaining the airgap section 408 in a conducting state. On the other hand, if the current as sensed by the current sensing device 224 is in the direction from the second terminal 304 to the first terminal 302 when a fault is detected, the controller 426 may first operate the power electronics section 306 for current interruption and may then operate the airgap section 408 for fail-safe operation and galvanic isolation while maintaining the airgap section 308 in the conducting state, in an embodiment.

Figure 5:
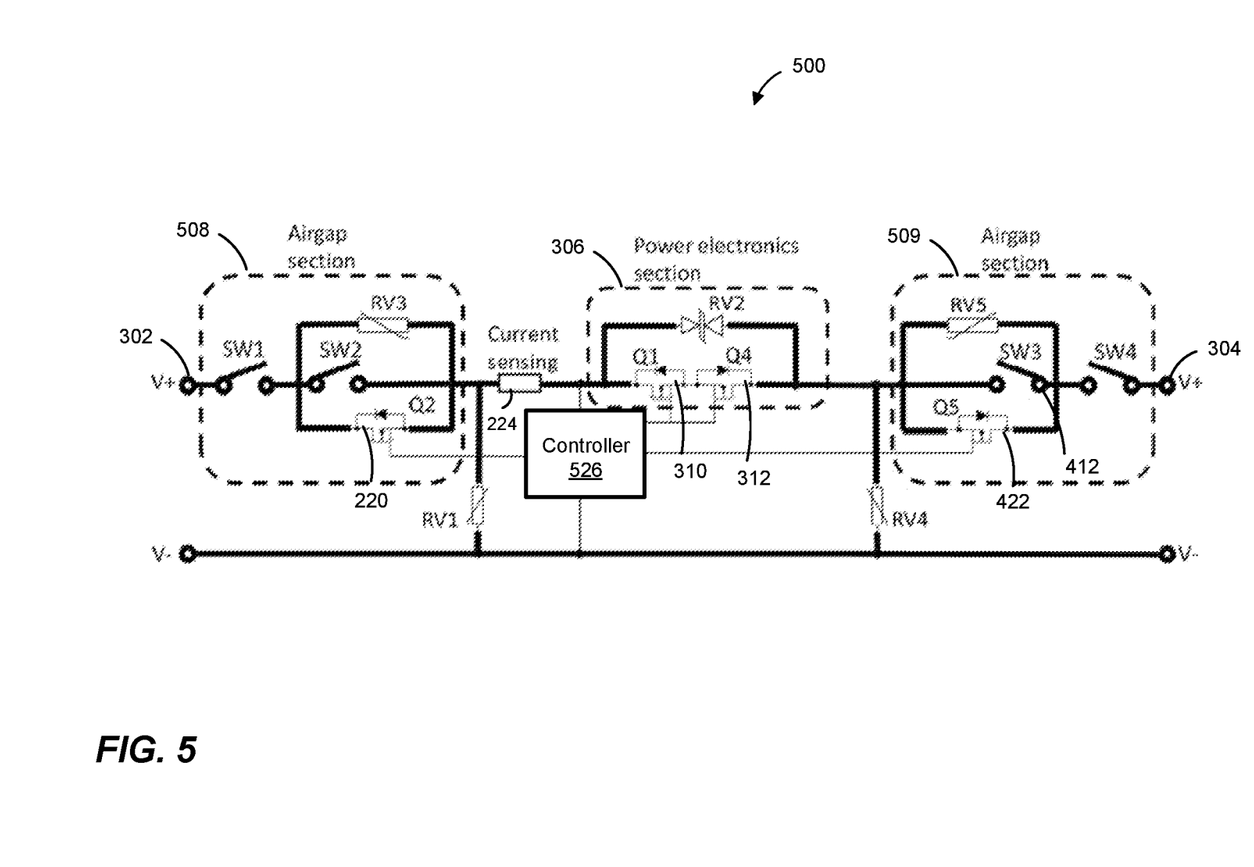
FIG. 5 is a diagram of a bidirectional DC solid state circuit breaker with airgap protection on two sides, according to another embodiment.

FIG. 5 is a diagram of a bidirectional DC solid state circuit breaker 500, according to an embodiment. The bidirectional DC solid state circuit breaker 500 is configured to operate in a DC power system, such as the DC power system 100 of FIG. 1, in some embodiments. For example, the DC solid state circuit breaker 500 corresponds to the DC solid state circuit breakers 112-2, 112-3 of FIG. 1, in an embodiment. In other embodiments, the bidirectional DC solid state circuit breaker 500 is utilized with DC power systems different from the DC power system 100 of FIG. 1 or is utilized with components that are not parts of a DC power system.

The bidirectional DC solid state circuit breaker 500 is similar to the bidirectional DC solid state circuit breaker 400 of FIG. 4 and includes same-numbered elements with the DC solid state circuit breaker 400 of FIG. 4. The bidirectional DC solid state breaker 500 includes the power electronics section 306, a first airgap section 508, and a second airgap section 509. The first airgap section 508 is generally the same as the first airgap section 308 in FIG. 4 except that the first airgap section 502 omits the third transistor switch Q3 222. Similarly, the second airgap section 509 is generally the same as the second airgap section 408 in FIG. 4 except that the second airgap section 509 omits the fifth transistor switch Q5 420. In this embodiment, the second transistor switch Q2 220 in the first airgap section 508 and the sixth transistor switch Q6 422 in the second airgap section 509 are arranged in the back to back configuration to provide bidirectional current interruption capabilities in the two airgap sections of the DC solid state circuit breaker 500.

The bidirectional DC solid state circuit breaker 500 includes a controller 526 that is similar to the controller 426 in FIG. 4, in an embodiment. The controller 526 is configured to determine whether to operate the first airgap section 508 or the second airgap section 509 to provide fail-safe operation and galvanic isolation based on a direction of current flow sensed by the current sensing device 224, in an embodiment. For example, if the current as sensed by the current sensing device 224 is in the direction from the first terminal 302 to the second terminal 304 when a fault is detected, the controller 526 may first operate the power electronics section 306 for current interruption and may then operate the first airgap section 508 for fail-safe operation and galvanic isolation while maintaining the second airgap section 509 in the conducting state. On the other hand, if the current as sensed by the current sensing device 224 is in the direction from the second terminal 304 to the first terminal 302 when the fault is detected, the controller 526 may first operate the power electronics section 306 for current interruption and may then operate the second airgap section 509 for fail-safe operation and galvanic isolation while maintaining the airgap section 508 in a conducting state, in an embodiment.

Figure 6:
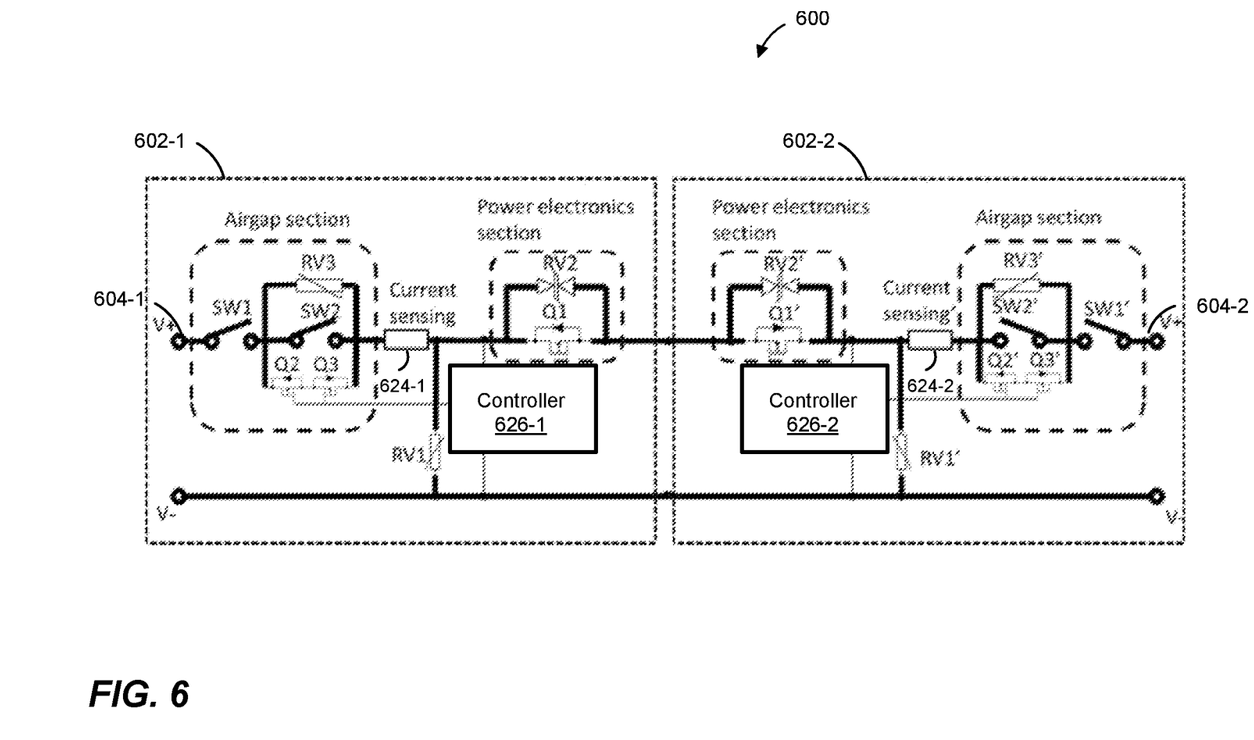
FIG. 6 is a diagram of a bidirectional DC solid state circuit breaker that includes two DC solid state circuit breaker modules, according to an embodiment.

FIG. 6 is a diagram of a bidirectional DC solid state circuit breaker 600, according to an embodiment. The bidirectional DC solid state circuit breaker 600 is configured to operate in a DC power system, such as the DC power system 100 of FIG. 1, in some embodiments. For example, the DC solid state circuit breaker 600 corresponds to the DC solid state circuit breakers 112-2, 112-3 of FIG. 1, in an embodiment. In other embodiments, the bidirectional DC solid state circuit breaker 600 is utilized with DC power systems different from the DC power system 100 of FIG. 1 or is utilized with components that are not parts of a DC power system.

The DC solid state circuit breaker 600 comprises two DC solid state circuit breaker circuit breaker modules with bidirectional current breaking capabilities, including a first DC solid state circuit breaker module 602-1 and a second DC solid state circuit breaker module 602-2, in an embodiment. The first DC solid state circuit breaker module 602-1 and a second DC solid state circuit breaker module 602-2 are connected in series and include a first terminal 604-1 and a second terminal 604-2. The second DC solid state circuit breaker module 602-2 is a mirrored version of the first DC solid state circuit breaker module 602-1, in an embodiment. Each of the first DC solid state circuit breaker module 602-1 and the second DC solid state circuit breaker module 602-2 comprises a unidirectional DC solid state circuit breaker with bidirectional current interruption capabilities, such as the unidirectional DC solid state circuit breaker 200 of FIG. 2, in an embodiment.

In an embodiment, the first DC solid state circuit breaker module 602-1 includes a current sensing device 624-1 and a controller 626-1. Similarly, the second DC solid state circuit breaker module 602-1 includes a current sensing device 624-2 and a controller 626-2. The current sensing devices 624-1, 624-2 may be the same as or similar to the current sensing device 224 in FIG. 2. Each of the controller 626-1, 626-2 is configurable to operate in a unidirectional mode or a bidirectional mode, in an embodiment. The mode of operation of the controller 626-1, 626-2 may be pre-set in-factory during manufacturing of the DC solid state circuit breaker 602-1 or may be user-configurable. In the unidirectional mode of operation, the controllers 626-1, 626-2 operate same as or similar to the controller 226 of the DC solid state circuit breaker 200 of FIG. 2, in an embodiment. In the pair mode of operation, the controllers 626-1, 626-2 operate as described in more detail below, in an embodiment.

In the configuration of the DC solid state circuit breaker 600, each of the controllers 626-1, 626-2 is configured to operate in the pair mode, in an embodiment. In the pair mode, the controller 626-1 is configured to i) if the current as sensed by the current sensing device 624-1 is flowing in the direction from the first terminal 604-1 to the second terminal 604-2, operate the first DC solid state circuit breaker module 602-1 to interrupt current and provide galvanic isolation and ii) if the current as sensed by the current sensing device 624-1 when a fault is detected is flowing in the direction the second terminal 604-2 to the first terminal 604-1, maintain the first DC solid state circuit breaker module 602-1 in the conducting state. Further, in the pair mode, the controller 626-2 is configured to, if the current as sensed by the current sensing device 624-2 is flowing in the direction from the second terminal 604-2 to the first terminal 604-1, operate the second DC solid state circuit breaker module 602-2 to interrupt current and provide galvanic isolation and ii) if the current as sensed by the current sensing device 624-1 when a fault is detected is flowing in the direction from the first terminal 604-1 to the second terminal 604-2, maintain the second DC solid state circuit breaker module 602-2 in the conducting state. Accordingly, if the current is flowing in the direction from the first terminal 604-1 to the second terminal 604-2 (i.e., in the direction from the first DC solid state circuit breaker module 602-1 to the second DC solid state circuit breaker module 602-2), then the first DC solid state circuit breaker module 602-1 is used to interrupt the current. Further, if the current is flowing in the direction from the second terminal 604-2 to the first terminal 604-1 (i.e., in the direction from the second DC solid state circuit breaker module 602-2 to the first DC solid state circuit breaker module 602-1), then the second DC solid state circuit breaker module 602-2 is used to interrupt the current.

Accordingly, in at least some embodiments, two unidirectional circuit breakers can be used to form a bidirectional circuit breaker, with the two unidirectional circuit breakers operating independently without any communication between controllers of the respective unidirectional circuit breakers. Such configurations allow for the manufacturing of unidirectional circuit breakers and use of the unidirectional circuit breakers to build bidirectional circuit breakers as needed, providing convenience and cost savings to the users, in at least some embodiments.

With continued reference to FIG. 6, in an embodiment, the DC solid state circuit breaker 600 may be manually turned off, for example by moving or otherwise tripping respective levers that may be provided on respective ones of the first DC solid state circuit breaker module 602-1 and the second DC solid state circuit breaker module 602-2. In an embodiment, because the first DC solid state circuit breaker module 602-1 and the second DC solid state circuit breaker module 602-2 each comprises a bidirectional airgap section for fail-safe operation, synchronization of tripping the handles of the first DC solid state circuit breaker module 602-1 and the second DC solid state circuit breaker module 602-2 may not be needed, in at least some embodiments.

Figure 7:
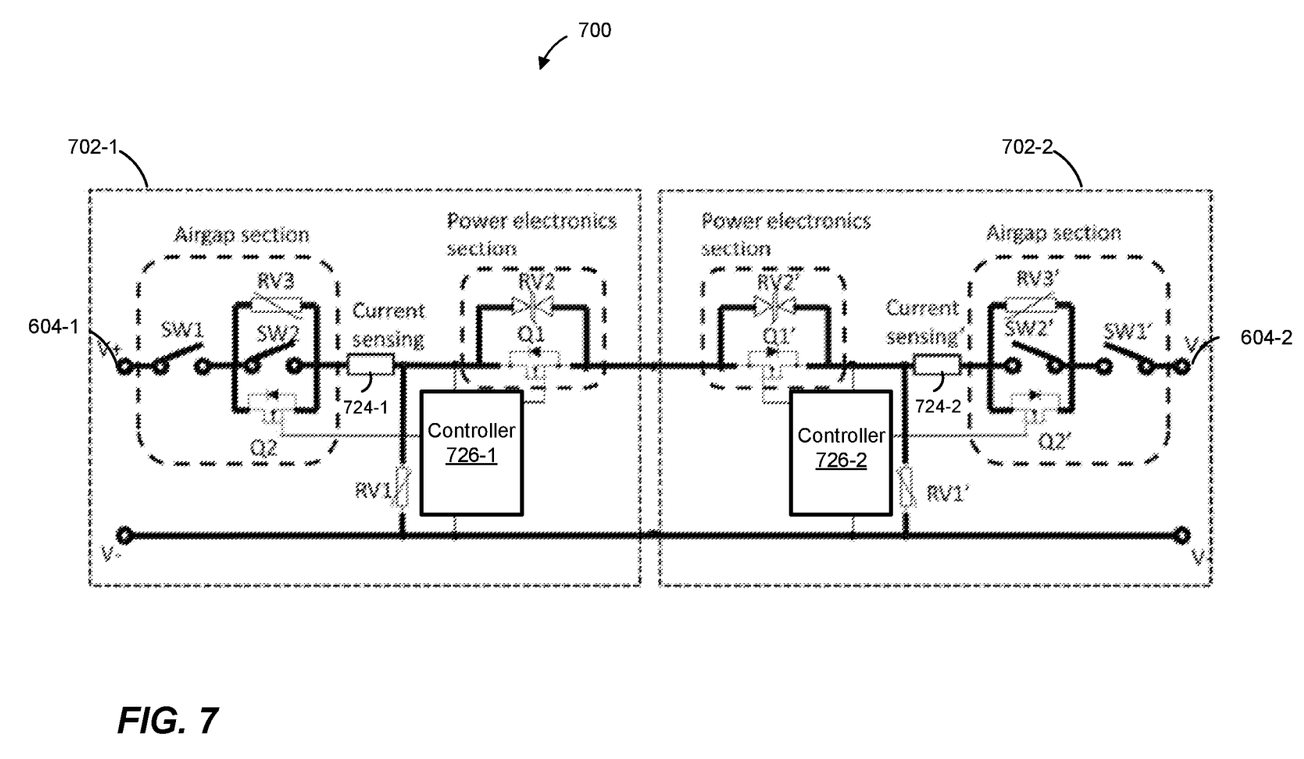
FIG. 7 is a diagram of a bidirectional DC solid state circuit breaker that includes two DC solid state circuit breaker modules, according to another embodiment.

FIG. 7 is a diagram of a bidirectional DC solid state circuit breaker 700, according to an embodiment. The bidirectional DC solid state circuit breaker 700 is configured to operate in a DC power system, such as the DC power system 100 of FIG. 1, in some embodiments. For example, the DC solid state circuit breaker 700 corresponds to the DC solid state circuit breakers 112-2, 112-3 of FIG. 1, in an embodiment. In other embodiments, the bidirectional DC solid state circuit breaker 700 is utilized with DC power systems different from the DC power system 100 of FIG. 1 or is utilized with components that are not parts of a DC power system.

The DC solid state circuit breaker 700 is similar to the DC solid state circuit breaker 600 of FIG. 6 except the DC solid state circuit breaker 700 comprises two unidirectional DC solid state circuit breakers, including a first unidirectional DC solid state circuit breaker 702-1 and a second DC solid state circuit breaker 702-2, without bidirectional current breaking capabilities. In an embodiment, the first DC solid state circuit breaker 702-1 includes a current sensing device 724-1 and a controller 726-1. Similarly, the second DC solid state circuit breaker 702-1 includes a current sensing device 724-2 and a controller 726-2. The current sensing devices 724-1, 724-2 may be the same as or similar to the current sensing device 224 in FIG. 2. Each of the controller 726-1, 726-2 is configurable to operate in a unidirectional mode or a bidirectional mode, in an embodiment. The mode of operation of the controller 726-1, 726-2 may be pre-set in-factory during manufacturing of the DC solid state circuit breaker 702-1 or may be user-configurable. In the unidirectional mode of operation, the controllers 726-1, 726-2 operate same as or similar to the controller 226 of the DC solid state circuit breaker 200 of FIG. 2, in an embodiment. In the pair mode of operation, the controllers 726-1, 726-2 operate same as or similar to the controllers 626-1, 626-2 of the DC solid state circuit breaker 600 of FIG. 6, in an embodiment.

Figure 8:
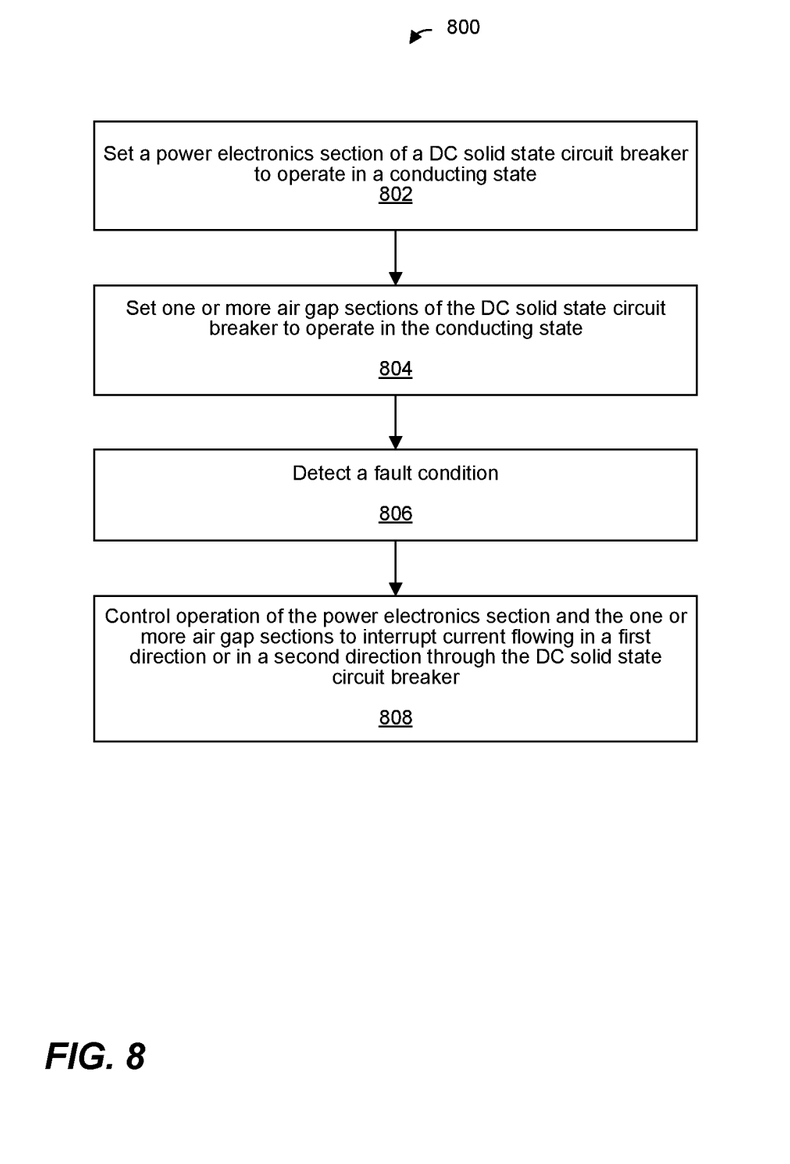
FIG. 8 is a flow diagram of a method for interrupting current in a DC solid state current breaker, according to an embodiment.

FIG. 8 is a flow diagram of an example method 800 for interrupting current in a DC solid state circuit breaker, according to an embodiment. In an embodiment, the method 800 is implemented by a DC solid state circuit breaker 112 of FIG. 1. In an embodiment, the method 800 is implemented by one of DC solid state circuit breaker 200, 300, 400, 500, 600, or 700 of FIGS. 2-7. In other embodiments, the method 800 is implemented by other suitable DC solid state circuit breaker and/or in other suitable DC power implementations.

At a block 802, a power electronics section of the DC solid state circuit breaker is set to operate in a conducting state. The power electronics section includes at least a first transistor switch, in an embodiment. Setting the power electronics section to operate in the conducting state may include switching ON the at least the first transistor switch. In an embodiment, a controller of the DC solid state circuit breaker switches ON the at least the first transistor switch. In other embodiments, the power electronics section is set to operate in the conducting state in other suitable manners.

At a block 804, one or more airgap sections of the DC solid state circuit breaker are set to operate in the conducting state. In an embodiment, the one or more airgap sections comprise at least a second transistor switch and a third transistor switch. The second transistor switch and the third transistor switch are arranged in back to back configuration such that i) the second transistor switch is configured to interrupt current flowing in a first direction from a first terminal of the DC solid state circuit breaker to a second terminal of the DC solid state circuit breaker and ii) the third transistor switch is configured to interrupt current flowing in a second direction from the second terminal of the DC solid state circuit breaker to the first terminal of the DC solid state circuit breaker. In an embodiment, the second transistor switch and the third transistor switch are provided in a bypass path of a hybrid airgap module in an airgap section of the DC solid state circuit breaker. In another embodiment, the second transistor switch and the third transistor switch are provided in bypass paths of respective hybrid airgap modules in different airgap sections of the DC solid state circuit breaker, such as i) a first airgap section provided between a first terminal of the DC solid state circuit breaker and the power electronics section and ii) a second airgap section provided between a second terminal of the DC solid state circuit breaker and the power electronics section.

Setting the one or more airgap sections to operate in the conducting state includes switching OFF the second transistor switch and the third transistor switch, in an embodiment. Setting the one or more airgap sections to operate in the conducting state additionally includes setting one or more mechanical switches provided in the one or more airgap sections to the closed position, in an embodiment. In an embodiment, the controller of the DC solid state circuit breaker switches OFF the second transistor switch and the third transistor switch and/or controls the one or more mechanical switches to operate in the closed position. In other embodiments, the one or more airgap sections to operate in the conducting state in other suitable manners.

At a block 806, a fault condition is detected. For example, a short circuit or an overcurrent condition is detected. The fault condition is detected while the power electronics section and the one or more airgap sections are set to operate in the conducting state, in an embodiment. In an embodiment, the controller of the DC solid state circuit breaker includes sensing circuitry configured to the detect the fault, and the controller of the DC solid state circuit breaker detects the fault using the sensing circuitry. In other embodiments, the fault is detected in other suitable manners.

At a block 808, the power electronics section and the one or more airgap sections are controlled to interrupt current flowing in a first direction or in a second direction through the DC solid state circuit breaker. Block 808 is performed in response to detecting the fault condition at block 806. In an embodiment, the controller of the DC solid state circuit breaker may control the power electronics section and the one or more airgap sections at block 808. Controlling the power electronics section and the one or more airgap sections may include determining a sequence of operation of the power electronics section and the one or more airgap sections based on a sensed direction of current flowing through the DC solid state circuit breaker when the fault is detected at block 806. For example, the controller may determine, based on the sensed direction of current, whether to i) first operate the power electronics section to provide current interruption and then operate at least one of the one or more airgap sections to provide fail-safe operation and isolation or ii) operate at least one of the one or more airgap sections to provide current interruption and isolation while maintaining the power electronics section in the conducting state. As another example, the controller may determine, based on the sensed direction of current, which airgap section to operate after current interruption by the power electronics section.

It is to be understood that the elements and features recited in the appended claims may be combined in different ways to produce new claims that likewise fall within the scope of the present invention. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description. Independent of the grammatical term usage, individuals with male, female or other gender identities are included within the term.

What is claimed is:

1. A direct current (DC) solid state circuit breaker, comprising:
   a first terminal;
   a second terminal;
   a power electronics section comprising at least a first transistor switch; and
   one or more airgap sections comprising at least a second transistor switch and a third transistor switch, the second transistor switch and the third transistor switch arranged in back to back configuration such that i) the second transistor switch is configured to interrupt current flowing in a first direction from the first terminal to the second terminal and ii) the third transistor switch is configured to interrupt current flowing in a second direction from the second terminal to the first terminal; and
   a controller configured to detect a fault condition and control operation of the power electronics section and the one or more airgap sections in response to detecting the fault condition.

2. The DC solid state circuit breaker of claim 1, further comprising a current sensing device configured to sense a direction of the current flowing through the DC solid state circuit breaker, wherein the controller is configured to determine a sequence of operation of the power electronics section and the one or more airgap sections based on the direction of the current sensed by the current sensing device.

3. The DC solid state circuit breaker of claim 2, wherein:
   the power electronics section comprises the first transistor switch arranged to interrupt the current flowing in the first direction from the first terminal to the second terminal,
   the one or more airgap sections comprise a first airgap section coupled between the first terminal and the power electronics section, the first airgap section including the second transistor switch and the third transistor switch, and
   the controller is configured to:
      when the direction of the current sensed by the current sensing device is from the first terminal to the second terminal, control the first transistor switch in the power electronics section to interrupt the current before operating the first airgap section, and
      when the direction of the current sensed by the current sensing device is from the second terminal to the first terminal, control the second transistor switch and the third transistor switch in the first airgap section to interrupt the current while maintain the first transistor switch in the power electronics section in a conducting state.

4. The DC solid state circuit breaker of claim 2, wherein the power electronics section comprises the first transistor switch and a fourth transistor switch, the first transistor switch and the fourth transistor switch arranged in back to back configuration.

5. The DC solid state circuit breaker of claim 4, wherein the one or more airgap sections comprise i) a first airgap section coupled between the first terminal and the power electronics section and ii) a second airgap section coupled between the second terminal and the power electronics section.

6. The DC solid state circuit breaker of claim 5, wherein:
   the first airgap section includes the second transistor switch arranged to interrupt the current flowing in the first direction from the first terminal to the second terminal, and
   the second airgap section includes the third transistor switch arranged to interrupt the current flowing in the second direction from the second terminal to the first terminal.

7. The DC solid state circuit breaker of claim 6, wherein the controller is configured to:
   when the direction of the current sensed by the current sensing device is from the first terminal to the second terminal, i) control the first transistor switch and the fourth transistor switch in the power electronics section to interrupt the current and ii) control the first airgap section to provide fail-safe operation and isolation, and
   when the direction of the current sensed by the current sensing device is from the second terminal to the first terminal, i) control the first transistor switch and the fourth transistor switch in the power electronics section to interrupt the current and ii) control the second airgap section to provide fail-safe operation and isolation.

8. The DC solid state circuit breaker of claim 1, wherein:
   the power electronics section comprises the first transistor switch and a fourth transistor switch, the first transistor switch and the fourth transistor switch arranged in back to back configuration,
   the one or more airgap sections comprises a first airgap section coupled between the first terminal and the power electronics section, the first airgap section including the second transistor switch and the third transistor switch, and
   the controller is configured to operate the first transistor switch and the fourth transistor switch in the power electronics section to interrupt the current before operating the first airgap section regardless of whether the current is flowing in the first direction from the first terminal to the second terminal or in the second direction from the second terminal to the first terminal.

9. The DC solid state circuit breaker of claim 1, wherein:
   the power electronics section comprises the first transistor switch and a fourth transistor switch, the first transistor switch and the fourth transistor switch arranged in back to back configuration,
   the one or more airgap sections comprises i) a first airgap section coupled between the first terminal and the power electronics section, the first airgap section including the second transistor switch and the third transistor switch and i) a second airgap section coupled between the second terminal and the power electronics section, the second airgap section including a fifth transistor switch and a sixth transistor switch, the fifth transistor switch and the sixth transistor switch arranged in back to back configuration, and the controller is configured to operate the first transistor switch and the fourth transistor switch in the power electronics section to interrupt the current before operating the first airgap section and the second airgap section regardless of whether the current is flowing in the first direction from the first terminal to the second terminal or in the second direction from the second terminal to the first terminal.

10. A direct current (DC) solid state circuit breaker, comprising:

a first DC solid state circuit breaker module including a first power electronics section, a first airgap section, a first current sensing device, and a first controller; and a second DC solid state circuit breaker module including a second power electronics section comprising, a second airgap section, a second current sensing device, and a second controller, wherein:

the first controller is configured to, when a fault is detected, operate the first DC solid state circuit breaker module to provide current interruption or maintain the first DC solid state circuit breaker module in a conducting state based on a direction of current flow sensed by the first current sensing device, and the second controller is configured to, when the fault is detected, operate the second DC solid state circuit breaker module to provide current interruption or maintain the second DC solid state circuit breaker module in a conducting state based on a direction of current flow sensed by the second current sensing device.

11. The DC solid state circuit breaker of claim 10, wherein:

the first controller is configured to i) operate the first power electronics section and the first airgap section to provide current interruption if the current, sensed by the first current sensing device, is flowing in a direction from the first DC solid state circuit breaker module when the fault is detected and ii) maintain the first power electronics section and the first airgap section in a conducting state if the current, sensed by the first current sensing device, is flowing in a direction from the second DC solid state circuit breaker module to the first DC solid state circuit breaker module when the fault is detected, and the second controller is configured to i) operate the second power electronics section and the second airgap section to provide current interruption if the current, sensed by the second current sensing device, is flowing in the direction from the second DC solid state circuit breaker module to the first DC solid state circuit breaker module when the fault is detected and ii) maintain the second power electronics section and the second airgap section in the conducting state if the current, sensed by the second current sensing device, is flowing in the direction from the first DC solid state circuit breaker module to the second DC solid state circuit breaker module when the fault is detected.

12. The DC solid state circuit breaker of claim 10, wherein the first controller and the second controller are configured to operate independently of each other.

13. The DC solid state circuit breaker of claim 10, wherein each of the first controller and the second controller is configurable to operate in a unidirectional mode or in a pair mode.

14. The DC solid state circuit breaker of claim 13, wherein each of the first controller and the second controller is configured to operate in the pair mode.

15. A method for interrupting current in a direct current (DC) solid state circuit breaker, the method comprising:

setting a power electronics section to operate in a conducting state, the power electronics section comprising at least a first transistor switch;

setting one or more airgap sections to operate in the conducting state, the one or more airgap sections comprising at least a second transistor switch and a third transistor switch, the second transistor switch and the third transistor switch arranged in back to back configuration such that i) the second transistor switch is configured to interrupt current flowing in a first direction from a first terminal of the DC solid state circuit breaker to a second terminal of the DC solid state circuit breaker and ii) the third transistor switch is configured to interrupt current flowing in a second direction from the second terminal of the DC solid state circuit breaker to the first terminal of the DC solid state circuit breaker;

while the power electronics section and the one or more airgap sections are operating in the conducting state, detecting a fault condition; and in response to detecting the fault condition, controlling operation of the power electronics section and the one or more airgap sections to interrupt current flowing in the first direction or in the second direction through the DC solid state circuit breaker.

16. The method of claim 15, further comprising sensing a direction of current flowing through the DC solid state circuit breaker, wherein controlling operation of the power electronics section and the one or more airgap sections includes determining a sequence of operation of the power electronics section and the one or more airgap sections based on the direction of the current sensed by the current sensing device.

17. The method of claim 16, wherein:

the power electronics section comprises the first transistor switch arranged to interrupt current flowing in the first direction from the first terminal to the second terminal, the one or more airgap sections comprise a first airgap section coupled between the first terminal and the power electronics section, the first airgap section including the second transistor switch and the third transistor switch, and controlling operation of the power electronics section and the one or more airgap sections includes:

when the current sensed by the current sensing device is flowing in the first direction from the first terminal to the second terminal, controlling the first transistor switch in the power electronics section to interrupt the current before operating the first airgap section, and when the current sensed by the current sensing device is flowing in the second direction from the second terminal to the first terminal, controlling the second transistor switch and the third transistor switch in the first airgap section to interrupt the current while maintaining the first transistor switch in the power electronics section in the conducting state.

18. The method of claim 16, wherein:

the power electronics section comprises the first transistor switch and a fourth transistor switch, the first transistor switch and the fourth transistor switch arranged in back to back configuration, the one or more airgap sections comprise i) a first airgap section coupled between the first terminal and the power electronics section, wherein the first airgap section includes the second transistor switch arranged to interrupt current flowing in the first direction from the first terminal to the second terminal and ii) a second airgap section coupled between the second terminal and the power electronics section, wherein the second airgap section includes the third transistor switch arranged to interrupt current flowing in the second direction from the second terminal to the first terminal, and controlling operation of the power electronics section and the one or more airgap sections includes:

when the current sensed by the current sensing device is flowing in the first direction from the first terminal to the second terminal, i) controlling the first transistor switch and the fourth transistor switch in the power electronics section to interrupt the current and ii) controlling the first airgap section to provide fail-safe operation and isolation, and     when the current sensed by the current sensing device is flowing in the second direction from the second terminal to the first terminal, i) controlling the first transistor switch and the fourth transistor switch in the power electronics section to interrupt the current and ii) controlling the second airgap section to provide fail-safe operation and isolation.

19. The method of claim 15, wherein:

the power electronics section comprises the first transistor switch and a fourth transistor switch, the first transistor switch and the fourth transistor switch arranged in back to back configuration, the one or more airgap sections comprise a first airgap section coupled between the first terminal and the power electronics section, the first airgap section including the second transistor switch and the third transistor switch, and controlling operation of the power electronics section and the one or more airgap sections includes controlling the first transistor switch and the fourth transistor switch in the power electronics section to interrupt the current before operating the first airgap section regardless of whether the current is flowing in the first direction from the first terminal to the second terminal or in the second direction from the second terminal to the first terminal.

20. The method of claim 15, wherein:

the power electronics section comprises the first transistor switch and a fourth transistor switch, the first transistor switch and the fourth transistor switch arranged in back to back configuration, the one or more airgap sections comprise i) a first airgap section coupled between the first terminal and the power electronics section, the first airgap section including the second transistor switch and the third transistor switch and i) a second airgap section coupled between the second terminal and the power electronics section, the second airgap section including a fifth transistor switch and a sixth transistor switch, the fifth transistor switch and the a sixth transistor switch arranged in back to back configuration, and controlling operation of the power electronics section and the one or more airgap sections includes controlling the first transistor switch and the fourth transistor switch in the power electronics section to interrupt the current before operating the first airgap section and the second airgap section regardless of whether the current is flowing in the first direction from the first terminal to the second terminal or in the second direction from the second terminal to the first terminal.

* * * * *